United States Patent [19]

Gaenzle et al.

[11] Patent Number: 4,655,429

[45] Date of Patent: Apr. 7, 1987

[54] SECURITY MOUNT

[75] Inventors: Todd Gaenzle, West Babylon; William F. Ziedler, Selden, both of N.Y.

[73] Assignee: Grumman Data Systems Corporation, Bethpage, N.Y.

[21] Appl. No.: 784,946

[22] Filed: Oct. 7, 1985

[51] Int. Cl.[4] .............................................. F16M 13/00

[52] U.S. Cl. ................................ 248/553; 248/205.3; 248/500; 70/58

[58] Field of Search ............... 248/553, 551, 552, 500, 248/510, 205.3, 205.1; 70/57, 58

[56] References Cited

U.S. PATENT DOCUMENTS

| | | | |
|---|---|---|---|
| 2,298,577 | 10/1942 | McPhail | 248/500 X |
| 2,486,032 | 10/1949 | Jimenez | 248/552 |
| 3,984,075 | 10/1976 | Bahner et al. | 70/58 X |
| 4,022,036 | 5/1977 | Cebuhar | 248/553 X |
| 4,535,863 | 8/1985 | Becker | 248/551 X |
| 4,553,414 | 11/1985 | Caputo et al. | 70/58 |
| 4,556,188 | 12/1985 | Allison | 70/58 |

*Primary Examiner*—Ramon O. Ramirez

*Attorney, Agent, or Firm*—Richard G. Geib; Daniel Jay Tick; Bernard S. Hoffman

[57] ABSTRACT

A security mounting arrangement for securing at least one computer and at least one piece of peripheral equipment to a surface. The arrangement has a first pad which contains a mounting aperture and a plurality of peripheral apertures and is fixedly attached to each of the at least one computer, a lock for securing the first pad to the surface, epoxy is used for fixedly attaching the first pad to each of the at least one computer, a second pad fixedly attached to each of the at least one piece of peripheral equipment and containing an aperture, epoxy is used for fixedly attaching the second pad to each of the at least one piece of peripheral equipment, and a cable is used for securing each of the at least one piece of peripheral equipment to the first pad.

6 Claims, 1 Drawing Figure

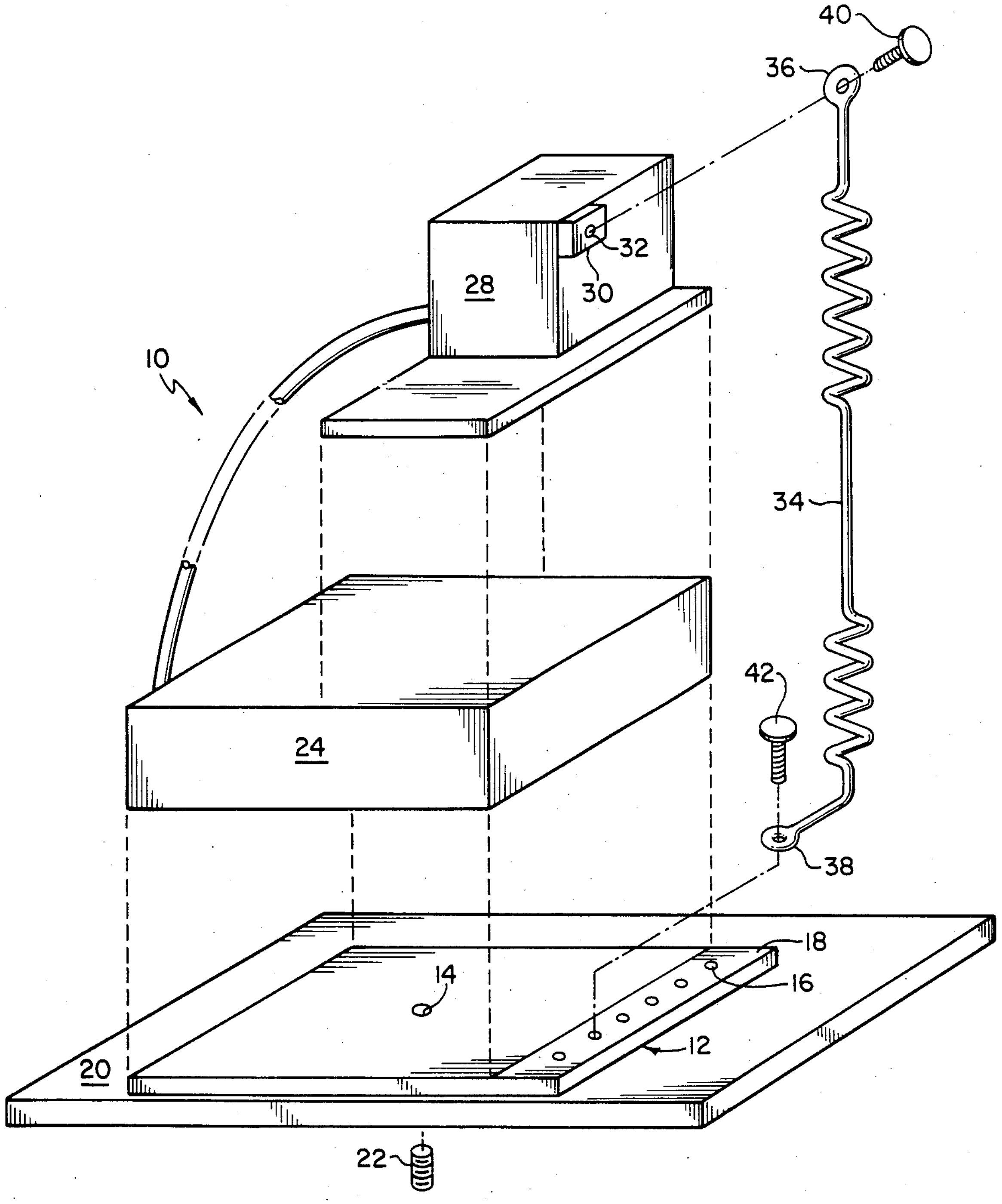
40
36
32
28
30
10
34
24
42
38
18
14
16
12
20
22

SECURITY MOUNT

BACKGROUND OF THE INVENTION

The present invention relates to a security mount. More particularly, it relates to a security mount for securing at least one computer and at least one piece of peripheral equipment to a surface.

Security mounts of the above mentioned general type are known in the art. One such security mount is disclosed, for example, in the U.S. Pat. No. 4,458,961 to Browning. The patent to Browning relates to a computer terminal work station that includes a selected grouping of modular drawer, file and shelf units which are fastened together. However, the patent to Browning does not teach means to prevent the theft of the computer terminal and periphral equipment from the work station.

Another such security mount is disclosed, for example, in the U.S. Pat. No. 4,313,149 to Hirose et al. The patent to Hirose et al relates to an electronic enclosure connecting structure. The patent to Hirose et al teaches electronic equipment enclosure connecting structures which are directly connected at portions near the corners of the sides of the enclosures. The interconnecting cable extends through the connected corner portions. However, the patent to Hirose et al does not teach means to prevent the theft of a computer terminal and peripheral equipment from the enclosures.

Finally, a further such security mount is disclosed, for example, in the U.S. Pat. No. 4,433,881 to Witten et al. The patent to Witten et al relates to a connecting and alignment mechanism for cabinet modules which must be accurately aligned and connected one to the other. However, the patent to Witten does not teach means to prevent the theft of a computer terminal and peripheral equipment from the cabinet.

SUMMARY OF THE INVENTION

Accordingly, it is an object of the present invention to provide a security mount which avoids the disadvantages of the prior art.

More particularly, it is an object of the present invention to provide a security mount arrangement which is inexpensive, east to install, and configured to allow for controlled disassembly for system mobility.

In keeping with these objects, and with others which will become apparent hereinafter, one feature of the present invention resides, briefly stated, in a security mount arrangement for securing at least one computer and at least one piece of peripheral equipment to a surface and having a first pad containing a mounting aperature and a plurality of peripheral apertures and being fixedly attached to each of the at least one computer, means for securing the first pad to the surface, means for fixedly attaching the first pad to each of the at least one computer, a second pad containing an aperture and being fixedly attached to each of the at least one piece of peripheral equipment, means for fixedly attaching the second pad to each of the at least one piece of peripheral equipment, wherein means for securing each of the at least one piece of peripheral equipment to the first pad is provided.

When the security mount is designed in accordance with the present invention, the at least one computer and the at least one piece of peripheral equipment is secured to the surface.

In accordance with another feature of the present invention, the means for securing the first pad to the surface includes a lock disposed in the mounting aperture of the first pad.

Another feature of the present invention is that the means for fixedly attaching the first pad to each of the at least one computer includes epoxy.

Yet another feature of the present invention is that the means for fixedly attaching the second pad to each of the at least one piece of peripheral equipment includes epoxy.

Still another feature of the present invention is that the means for securing each of the at least one piece of peripheral equipment to the first pad includes a cable having ends affixed in the aperture of the second pad and in at least one of the plurality of peripheral aperatures of the first pad.

Finally, still a further feature of the present invention is that the ends of the cable are affixed in the aperture of the second pad and in the at least one of the plurality of peripheral apertures by tamper proof screws.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The sole FIGURE is an exploded projection of the security mount of the present invention.

DESCRIPTION OF THE PREFERRED EMBODIMENT

Referring now to the FIGURE, the security mount of the present invention is shown generally at 10.

A first pad 12 contains a mounting aperture 14 disposed therethrough and a plurality of peripheral apertures 16 also disposed therethrough on an overhang 18. The first pad 12 is locked to a surface 20 by a lock 22 which passes through the mounting aperture 14. At least one computer 24 is secured by epoxy to the first pad 12 and is therefore also secured to the surface 20.

At least one piece of peripheral equipment 28 is restable on the at least one computer 24, as shown. A second pad 30, containing an aperture 32, is secured by epoxy to the at least one piece of peripheral equipment 28.

A cable 34, containing two eyelet ends 36 and 38, is attached, by tamper proof screws 40 and 42, to the aperture 32 of the second pad 30 and to at least one of the plurality of apertures 16 of the first pad 12. Thus, the at least one piece of peripheral equipment 28 is secured to the first pad 12 which in turn is secured to the surface 20 by the lock 22.

In operation, an improved means for securing the at least one computer 24 and the at least one piece of peripheral equipment includes bonding with epoxy the second pad 30 to the at least one piece of peripheral equipment 28 and the first pad 12 to the at least one computer 24. The first pad 12 is held to the desk, table or surface 20 by the lock 22 which is threaded through the mounting aperture 14. The cable 34, with eyelet ends 36 and 38, is connected by tamper proof screws 40 and 42 to the second pad 30 and to the overhang 18 of the first pad 12.

It will be understood that each of the elements described above, or two or more together, may also find a useful application in other types of constructions differing from the types described above.

While the invention has been illustrated and described as embodied in a security mount, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A security mount for securing at least one computer and at least one piece of peripheral equipment to a surface of the at least one computer, comprising:
   a first pad fixedly attached to each of the at least one computer and containing a mounting aperture and a plurality of peripheral apertures;
   means for securing said first pad to the surface;
   means for fixedly attaching said first pad of each of the at least one computer;
   a second pad fixedly attached to each of the at least one piece of peripheral equipment and containing an aperture;

means for fixedly attaching said second pad to each of the at least one piece of peripheral equipment; and
   means for securing said second pad attached to each of the at least one piece of peripheral equipment to said first pad so that the at least one computer and the at least one piece of peripheral equipment is secured to the surface.

2. A security arrangement as defined in claim 1, wherein said means for securing said first pad to the surface includes a lock disposed in said mounting aperture of said first pad.

3. A security arrangement as defined in claim 1, wherein said means for fixedly attaching said first pad to each of the at least one computer includes epoxy.

4. A security arrangement as defined in claim 1, wherein said means for fixedly attaching said second pad to each of the at least one piece of peripheral equipment includes epoxy.

5. A security arrangement as defined in claim 1, wherein said means for securing said second pad attached to each of the at least one piece of peripheral equipment to said first paid includes a cable having ends affixed in said aperture of said second pad and in at least one of said plurality of peripheral apertures of said first pad.

6. A security arrangement as defined in claim 5, wherein said ends of said cable are affixed in said aperture of said second pad and in said at least one of said plurality of peripheral apertures by tamper proof screws.

* * * * *

UNITED STATES PATENT AND TRADEMARK OFFICE
CERTIFICATE OF CORRECTION

PATENT NO. : 4,655,429

DATED : April 7, 1987

INVENTOR(S) : TODD GAENZLE ET AL

It is certified that error appears in the above-identified patent and that said Letters Patent is hereby corrected as shown below:

Title sheet [75] "William F. Ziedler" should be -- William F. Zeidler --
Col. 1, line 46, "east" should be -- easy --
Col. 1, lines 53 and 54, "aperature" should be -- aperture --
Col. 2, lines 16 and 17, "aperatures" should be -- apertures --
Col. 3, line 19, the colon should be a period
Col. 3, line 27, which is Claim 1, "of" (first occurrence) should be -- to --
Col. 4, line 22, which is Claim 5, "paid" should be -- pad --

Signed and Sealed this

Eighteenth Day of August, 1987

*Attest:*

DONALD J. QUIGG

*Attesting Officer*

*Commissioner of Patents and Trademarks*